United States Patent
Tsukamoto (10) Patent No.: US 6,714,356 B2
(45) Date of Patent: Mar. 30, 2004

(54) OPTICAL DEVICE PROVIDED WITH TREMBLE CORRECTING FUNCTION

(75) Inventor: Shinji Tsukamoto, Saitama (JP)

(73) Assignee: PENTAX Corporation, Tokyo (JP)

( * ) Notice: Subject to any disclaimer, the term of this patent is extended or adjusted under 35 U.S.C. 154(b) by 47 days.

(21) Appl. No.: 10/084,423

(22) Filed: Feb. 28, 2002

(65) Prior Publication Data

US 2002/0118470 A1 Aug. 29, 2002

(30) Foreign Application Priority Data

Feb. 28, 2001  (JP) .................... P2001-054546

(51) Int. Cl.[7] .................... G02B 15/14; G02B 27/64; G03B 17/00
(52) U.S. Cl. .................... 359/696; 359/597; 359/557; 396/52; 396/55
(58) Field of Search ................ 359/554, 557, 359/637, 696, 697, 823, 824, 555, 556, 694, 407–412, 704; 310/316.01, 317; 396/52, 55

(56) References Cited

U.S. PATENT DOCUMENTS

| | | | |
|---|---|---|---|
| 5,517,238 A | * | 5/1996 | Hirasawa .............. 348/208.12 |
| 5,826,115 A | * | 10/1998 | Washisu et al. .............. 396/55 |
| 5,864,722 A | * | 1/1999 | Aoki et al. .................. 396/263 |
| 6,009,279 A | * | 12/1999 | Kai et al. ...................... 396/55 |
| 6,064,532 A | * | 5/2000 | Enomoto ..................... 359/694 |
| 6,078,751 A | * | 6/2000 | Yamazaki et al. ............. 396/55 |
| 6,208,464 B1 | | 3/2001 | Tsukamoto et al. ......... 359/557 |
| 6,225,613 B1 | | 5/2001 | Tsukamoto et al. ....... 250/201.2 |
| 6,252,713 B1 | | 6/2001 | Hirunuma et al. .......... 359/557 |
| 6,266,190 B1 | | 7/2001 | Hirunuma et al. .......... 359/557 |
| 6,330,398 B1 | * | 12/2001 | Tanaka et al. ................ 396/52 |
| 6,374,048 B1 | * | 4/2002 | Uenaka et al. ................ 396/52 |

* cited by examiner

*Primary Examiner*—Ricky Mack
(74) *Attorney, Agent, or Firm*—Greenblum & Bernstein, P.L.C.

(57) ABSTRACT

In binoculars provided with a tremble preventing function, correction lenses are held by a lateral-direction driving frame which is supported in an opening portion of a lengthwise-direction driving frame. The state of the power switch of the binoculars is detected. If the power switch is ON, the output voltage level of a power battery is compared with a threshold. If the output voltage level is below the threshold, the driving frames are driven to a reset position and further to a moving center position, and then the power is turned OFF. If the output voltage level is higher than the threshold, a tremble preventing operation is carried out. The check of the output voltage level and the tremble preventing operation are repeatedly performed every one millisecond.

5 Claims, 9 Drawing Sheets

OPTICAL DEVICE PROVIDED WITH TREMBLE CORRECTING FUNCTION

BACKGROUND OF THE INVENTION

1. Field of the Invention

This invention relates to an optical device provided with a tremble correcting function which corrects a tremble of a focused image.

2. Description of the Related Art

Conventionally, in the field of optical devices, for example binoculars, there is a type which is provided with a tremble preventing function. The tremble preventing function is a function which corrects a focused image tremble caused by a hand tremble and so on.

For example, in binoculars, the tremble preventing function is carried out by a tremble detector, a pair of correcting optical systems, and a driving mechanism. The tremble detector detects a tremble of left and right telephoto optical systems. The driving mechanism drives the pair of correcting optical systems in two directions on a plane which is perpendicular to the optical axes of the correcting optical systems. The correcting optical systems are positioned between the objective optical systems and the inversion optical systems such that one of the correcting optical systems is included in the right telephoto optical system and the other of the correcting optical systems is included in the left telephoto optical system.

When the binoculars are shaken by a hand tremble or such like, the tremble of the optical axes of the telephoto optical systems is detected by the tremble detector. The correcting optical systems are driven by the driving mechanism in the two directions crossing at right angles on the plane perpendicular to the optical axes of the correcting optical systems such that the tremble of the optical axes is canceled. Consequently, the tremble of the image obtained by the telephoto optical systems is prevented.

As the driving mechanism, a stepping motor, for example, is utilized. In the stepping motor, a rotational movement of a rotor is converted to a linear movement in a thrust direction of a shaft, by a screw feeder mechanism. A holding member of the pair of correcting optical systems is driven in accordance with the movement of the shaft in the thrust direction. Accordingly, a driving direction and a driving amount of the holding frame are decided by controlling an electric current which flows through a coil of a stator of the stepping motor.

As described above, the screw feeder mechanism is utilized for converting the rotational movement of the rotor to the linear movement of the shaft. Accordingly, in a situation where the supply of electric power to the stepping motor is stopped, it is extremely difficult to supply sufficient external power in the thrust direction of the shaft so that the torque required to rotate the rotor is generated.

In other words, when the supply of electric power to the stepping motor is stopped, the rotor is stopped and the shaft is fixed at a position in the thrust direction, at which the shaft is stopped at that time. Consequently, the correcting optical systems are fixed at a position at which they are stopped when the electric power supply was stopped.

The above-mentioned tremble preventing function is not always working while the binoculars are being used. For example, there is a tremble preventing button, which is placed at a predetermined position on the outer surface of a case of the binoculars. By manipulating the tremble preventing button, the start and stop of the tremble preventing function are controlled. Namely, the tremble preventing function is optionally carried out in accordance with the situation. Further, the tremble preventing function is independent from other functions, for example, the focusing function and the interpupillary adjustment function. Accordingly, an object can be viewed by the binoculars without carrying out the tremble preventing function.

Generally, users carry the binoculars to a place to be observed. Accordingly, in binoculars provided with the tremble preventing function, a battery is utilized as an electric power supply for the stepping motor. Because, the battery is very portable, it does not reduce the portability of the binoculars.

However, the amount of electric power supplied by the battery is limited. Accordingly, the supply from the battery may be suddenly stopped, while the tremble preventing function is being carried out. If the supply is suddenly stopped, the correcting optical systems may be fixed in a state where the optical axes of the correcting optical systems do not coincide with the optical axes of the other optical systems of the telephoto optical systems.

As described above, it is possible to observe the object with the binoculars even if the tremble preventing function does not work. Accordingly, if the correcting optical systems is fixed in the above-mentioned state, that is, the optical systems do not coincide, there is a problem that an actual object image viewed through the telephoto optical systems does not coincide with a theoretical (desired) object image that lies on the optical axis of the lens barrels of the binoculars, making the user feel slight physical discomfort.

SUMMARY OF THE INVENTION

Therefore, an object of the present invention is to make sure that an actual object image coincides with the theoretical (desired) object image that lies on an optical axis of a lens barrel, in an optical device provided with a tremble preventing function.

In accordance with an aspect of the present invention, there is provided an optical device, provided with a tremble preventing function, comprises: a tremble detector that detects an amount of an optical device tremble; a correcting optical system, included in an imaging optical system of the optical device, that corrects a tremble of a focused image due to the optical device tremble; a driving system that drives the correcting optical system in two directions on a plane perpendicular to an optical axis of the correcting optical system, and continues to maintain a position of the correcting optical system when a power supply to the optical device is stopped; a controller that controls the driving system such that the optical device tremble amount is canceled; a power battery that supplies electric power to the driving system; and a voltage level detector that detects an output voltage level of the power battery. When the output voltage level detected by the voltage level detector is below a predetermined threshold, the correcting optical system is driven to a standard position such that the optical axis of the correcting optical system coincides with an optical axis of other optical systems included in the imaging optical system.

Preferably, the value of the threshold is set such that the remaining amount of electric power in the power battery is enough for the driving system to drive the correcting optical system from a moving limit position to the standard position. The moving limit position is defined by a holding member of the correcting optical system and is the furthest position from the standard position.

Preferably, the optical device further comprises a memory in which the predetermined threshold is stored.

For example, the memory is an EEPROM.

In accordance with another aspect of the present invention, there is provided an optical device comprising:

a correcting optical system, included in an imaging optical system of the optical device, for correcting a tremble of a focused image due to an optical device tremble; and a tremble preventing function which corrects the focused image tremble by driving the correcting optical system such that the optical device tremble can be cancelled. When the tremble preventing function is not carried out, the correcting optical system is maintained at all times at a position at which an optical axis of the correcting optical system coincides with an optical axis of other optical systems of the imaging optical system of the optical device.

As described above, according to the present invention, when the output voltage level of the battery becomes lower than the predetermined threshold, the correcting optical system is driven to the standard position. Accordingly, even if the output voltage level falls while the tremble prevention function is working, the position of the correcting optical system is changed to a state where the optical axis of the correcting optical system coincides with the optical axes of the other optical systems of the imaging optical system.

Further, the value of the predetermined threshold is set such that the correcting optical system can be driven from the moving limit position to the standard position. Accordingly, the correcting optical system is reliably driven to the standard position.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

The present invention will now be described with reference to an embodiment shown in the drawings.

Figure 1:
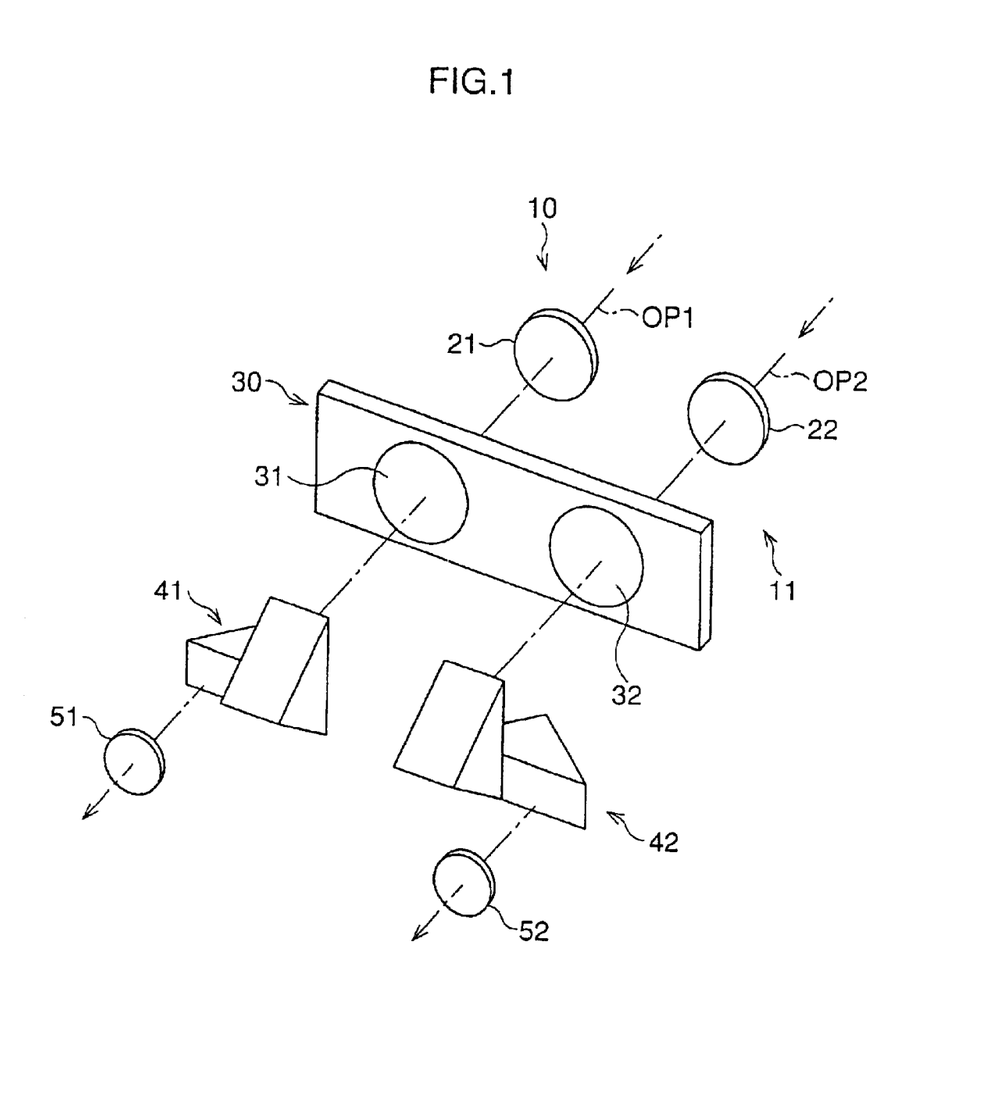
FIG. 1 is a conceptional view showing positional relationships between optical systems of binoculars to which an embodiment according to the present invention is applied.

FIG. 1 is a conceptional view showing positional relationships between optical systems of binoculars to which an embodiment, according to the present invention, is applied. In a first optical system 10, after passing through a first objective lens 21 and a first correction lens 31, reflected light from an object (not shown) is directed to a first eyepiece 51 through a first erecting prism 41. In a second optical system 11, after passing through a second objective lens 22 and a second correction lens 32, the reflected light is directed to a second eyepiece 52 through a second erecting prism 42.

The first and second correction lenses 31 and 32 are unitarily supported by a lens supporting frame 30. The relational position between each element of the first and second optical systems 10 and 11 is adjusted, such that an optical axis OP1 of the first optical system 10 and an optical axis OP2 of the second optical system 11 are aligned in parallel.

Note that, in this specification, a "lateral direction" means a direction parallel to a standard plane on which the optical axes OP1 and OP2 lie, being perpendicular to the optical axes OP1 and OP2, and a "lengthwise direction" means a direction perpendicular to the standard plane.

Further, a "lengthwise-direction moving center position" means a position of the lens supporting frame 30 when optical axes of the correction lenses 31 and 32 lie on the standard plane. Furthermore, a "lateral-direction moving center position" means a position of the lens supporting frame 30 when the optical axis of the correction lens 31 lies on a plane, which is perpendicular to the standard plane and on which the optical axis OP1 lies, and the optical axis of the correction lens 32 lies on a plane which is perpendicular to the standard plane and on which the optical axis OP2 lies.

A "standard position" means a position of the first and second correction lenses 31, 32 when the optical axis of the first correction lens 31 coincides with the optical axis OP1 and the optical axis of the second correction lens 32 coincides with the optical axis OP2. Namely, while the first and second correction lenses 31, 32 are at the standard position, the lens supporting frame 30 is positioned at the lengthwise-direction moving center position and also at the lateral-direction moving center position.

Figure 2:
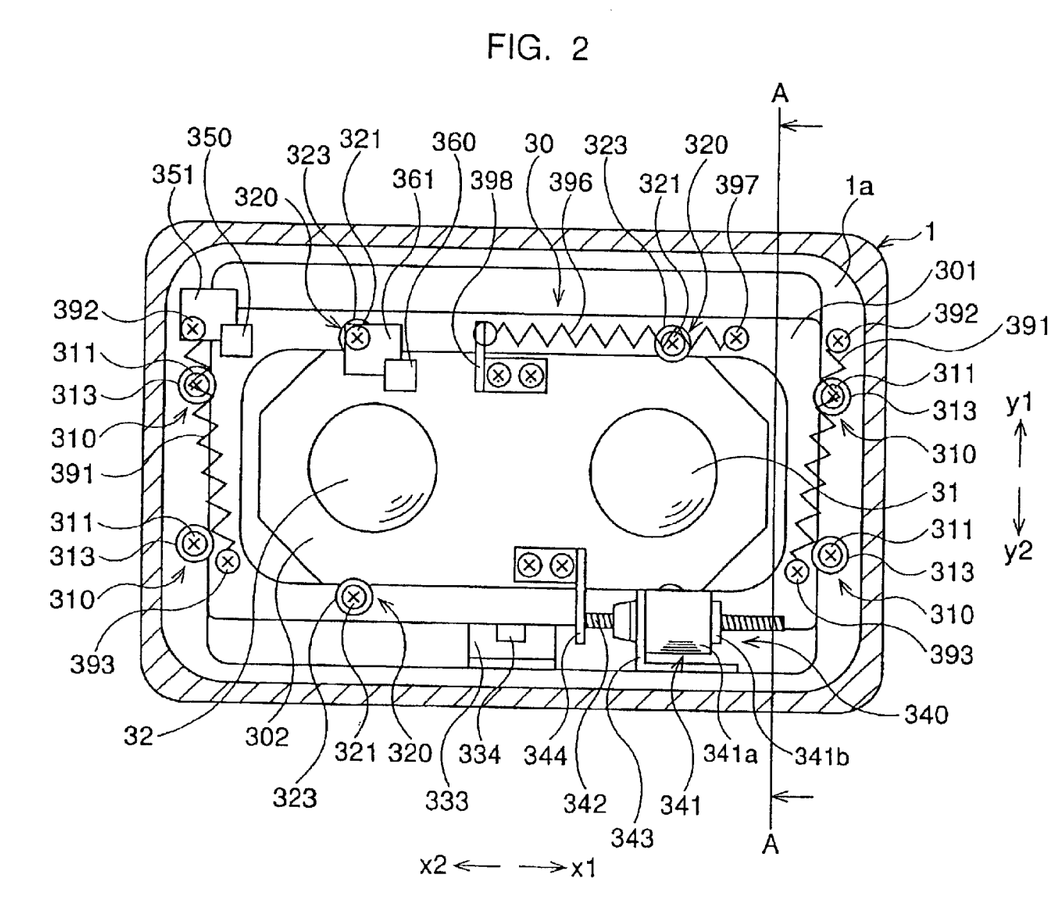
FIG. 2 is a front view of a lens supporting frame of the embodiment.

FIG. 2 is a front view of the lens supporting frame 30, viewed from the side of the first and second objective lenses 21 and 22. The lens supporting frame 30 includes a lengthwise-direction driving frame 301 and a lateral-direction driving frame 302. The lengthwise-direction driving frame 301 is a flat board. A through-hole opening is formed in a center of the driving frame 301. Namely, the driving frame 301 is a doughnut-shaped board. The driving frame 301 is supported by holding members 310 mounted on a flange 1a, which is unitarily formed on an inner wall 1 of the binoculars, to be slidable in the lengthwise direction so that the driving frame 301, when driven, is led in the lengthwise direction.

The driving frame 302 is a flat board which unitarily holds the correction lenses 31 and 32, and is disposed in the through-hole opening of the driving frame 301. The driving frame 302 is supported by holding members 320 mounted on the driving frame 301, and is slidable in the lateral direction so that the driving frame 302, when driven, is led in the lateral direction.

Figure 3:
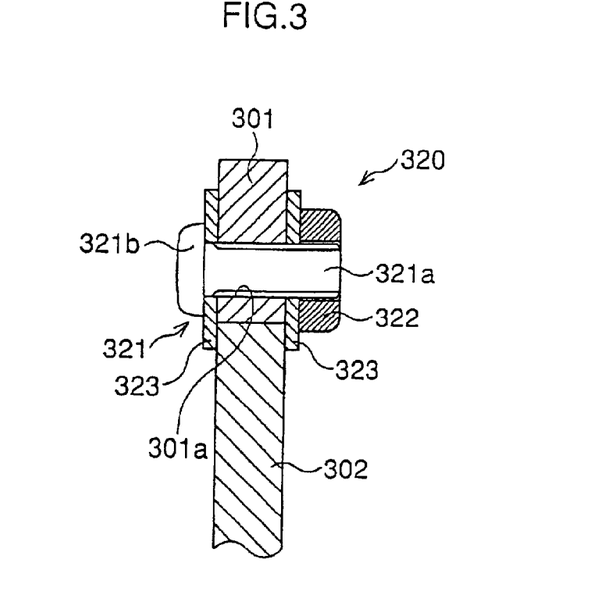
FIG. 3 is an enlarged sectional side view of a holding member.

FIG. 3 is a sectional side view of the holding member 320. The holding member 320 comprises a screw 321, a nut 322 and a pair of washers 323. A shaft 321a of the screw 321 is received in a hole 301a formed in the lengthwise-direction driving frame 301. A thread is formed on the shaft 321a. The nut 322 is threadingly engaged on a free end of the shaft 321a, opposite a head 321b of the screw 321. One washer 323 is mounted between the head 321b and the driving frame 301, and another washer 323 is mounted between the nut 322 and the driving frame 301.

The radii of the washers 323 are greater than the length between a side surface of the driving frame 301, which is in contact with the side surface of the lateral-direction driving frame 302 and a longitudinal central axis of the shaft 321a. Namely, a perimeter portion of the driving frame 302 is lightly clamped by the pair of the washers 323, such that the driving frame 302 is unable to move in a direction parallel to the optical axes OP1 and OP2.

The holding member 310 (see FIG. 2) has a similar construction to that of the holding member 320. A shaft of a screw 311 is received in a hole formed in the flange 1a, and a nut (omitted in FIG. 2) is threadingly engaged on a free end of the shaft, opposite a head of the screw 311. One washer 313 (see FIG. 2) is mounted between the head of the screw 311 and the flange 1a, and another washer (not shown) is mounted between the nut and the flange 1a. A perimeter of the lengthwise-direction driving frame 301 is lightly clamped by the washers 313. Namely, similarly to the lateral-direction driving frame 302, the lengthwise-direction driving frame 301 is held by the washers 313 so as not to move in a direction parallel to the optical axes OP1 and OP2.

The perimeter of the lengthwise-direction driving frame 301, mounted in the flange 1a, is lightly clamped by the pair of washers 313 of the holding member 310, with the perimeter portion of the driving frame 302, mounted in the opening of the frame 301, being lightly clamped by the pair of the washers 323 of the holding member 320. Namely, the flange 1a and the frames 301, 302 are formed so that the thickness of the flange 1a, along the optical axes OP1 and OP2, is larger than the thickness of the frame 301, along the optical axes OP1, OP2, and the thickness of the frame 301 is larger than the thickness of the frame 302, along the optical axes OP1 and OP2.

Further, a difference between the thickness of the flange 1a and the thickness of the driving frame 301 is small, such that the movement of the driving frame 301 in the lengthwise direction is uneffected by friction between the pair of washers 313 and the driving frame 301, and the movement of the driving frame 301 parallel to the optical axes OP1 and OP2 is negligible.

Furthermore, a difference between the thickness of the driving frame 301 and the thickness of the driving frame 302 is small, such that the movement of the driving frame 302 in the lateral direction is uneffected by friction between the pair of washers 323 and the driving frame 302, and the movement of the driving frame 302 parallel to the optical axes OP1, OP2 is negligible.

Figure 4:
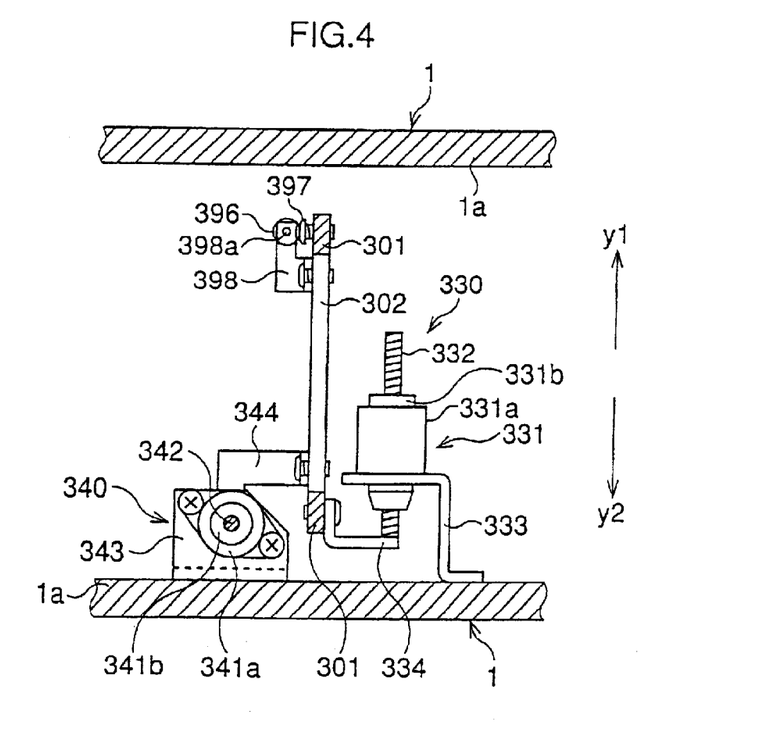
FIG. 4 is a sectional side view of the lens supporting frame of the embodiment.

FIG. 4 is a sectional side view taken in the direction of the arrows substantially along the line A—A of FIG. 2. Actuators of this embodiment will be explained, with reference to FIGS. 2 and 4.

A lengthwise-direction actuator, generally indicated by reference 330, is placed at a center portion of the driving frames 301 and 302, on a side of the first and second erecting prisms 41 and 42 (see FIG. 1). The lengthwise-direction actuator 330 comprises a stepping motor 331 and a shaft 332. The stepping motor 331 comprises a motor case 331a and a motor 331b which is mounted in the motor case 331a.

The motor 331b can rotate in forward and reverse directions around a lengthwise direction axis. The shaft 332 is supported so as to be unitarily rotatable with the rotational movement of the motor 331b and movable along the longitudinal axis thereof. A thread is formed on the outer surface of the shaft 332, and the shaft 332 is engaged with a female thread (omitted in FIGS. 2 and 4) formed on the inner surface of a quill of the motor case 331a. Namely, the shaft 332 rotatably extends or retracts in the longitudinal direction, in accordance with the rotational direction, forward and reverse, of the motor 331b.

The motor case 331a is fixed at the flange 1a by a first fixing member 333. A ball is mounted on the tip of the shaft 332. The ball of the shaft 332 abuts a first pressed member 334 fixed at the lower portion of the lengthwise-direction driving frame 301.

First coil springs 391 are disposed close to the side end of the frame 301, on a side of the first and second objective lenses 21 and 22 (see FIG. 1). Both ends of the first coil spring 391 are respectively hook-shaped. One end is hooked with a screw 392 which is engaged with a portion of the flange 1a close to the upper side thereof, and another end is engagedly hooked on a screw 393 which is engaged with a portion of the frame 301 close to a lower side thereof. Namely, the first coil springs 391 urge the frame 301 in the direction y1. Accordingly, the ball of the shaft 332 contacts the first pressed member 334 at all times.

A lateral-direction actuator, generally indicated by reference 340, is placed at a portion close to the lower side of the driving frames 301 and 302, on a side of the first and second objective lenses 21 and 22 (see FIG. 1), being also disposed on a side of the first correction lens 31 viewed from a center axis of the frames 301 and 302 along the lengthwise direction. The lateral-direction actuator 340 comprises a stepping motor 341 and a shaft 342. The stepping motor 341 comprises a motor case 341a and a motor 341b, which is mounted in the motor case 341a.

The motor 341b can rotate in forward and reverse directions around a lateral direction axis. The shaft 342 is supported so as to be unitarily rotatable with the rotational movement of the motor 341b and movable along the longitudinal axis thereof. A thread is formed on the outer surface of the shaft 342, and the shaft 342 is engaged with a female thread (omitted in FIGS. 2 and 4) formed on the inner surface of a quill of the motor case 341a. Namely, the shaft 342 rotatably extends or retracts in the longitudinal direction, in accordance with the rotational direction, forward and reverse, of the motor 341b.

The motor case 341a is fixed at the flange 1a by a second fixing member 343. A ball is mounted on the tip of the shaft 342. The ball of the shaft 342 abuts a second pressed member 344 fixed at the lower portion of the lateral-direction driving frame 302.

A second coil spring 396 is disposed at the upper portion of the frame 301, on a side of the first and second objective lenses 21 and 22 (see FIG. 1). Both ends of the second coil spring 396 are respectively hook-shaped. One end is engagedly hooked on a screw 397 which is engaged with a portion of the upper end of the frame 301, on the side at which the first correction lens 31 is placed. Another end is engagedly hooked on a hole 398a formed in a flange 398, which is fixed at a central portion of the frame 302, at the upper end thereof. Namely, the second coil spring 396 urges the frame 302 in the direction x1. Accordingly, the ball of the shaft 342 contacts the second pressed member 344.

When the motor 331b rotates in the forward direction, the shaft 332 rotatably extends in the direction y2 (the downward direction). The movement of the shaft 332 in the direction y2 is transmitted to the lengthwise-direction driving frame 301 through the first pressed member 334. As described above, the frame 301 is slidably supported by the flange 1a, so that the frame 301 is driven in the direction y2, in accordance with the rotational movement of the motor 331b, resisting the spring force of the first coil springs 391 in the direction y1. On the other hand, when the motor 331b rotates in the reverse direction, the shaft 332 rotatably retracts in the direction y1 (the upward direction), so that the frame 301 is driven in the direction y1 by the spring force of the first coil springs 391.

When the motor 341b rotates in the forward direction, the shaft 342 rotatably extends in the direction x2 (the left direction in FIG. 2). The movement of the shaft 342 in the direction x2 is transmitted to the lateral-direction driving frame 302 through the pressed member 344. As described above, the frame 302 is slidably supported by the frame 301, so that the frame 302 is driven in the direction x2, in accordance with the rotational movement of the motor 341b, resisting the spring force of the second coil spring 396 in the direction x1. On the other hand, when the motor 341b rotates in the reverse direction, the shaft 342 rotatably retracts in the direction x1 (the right direction in FIG. 2), so that the frame 302 is driven in the direction x1 by the spring force of the second coil spring 396.

Figure 11:
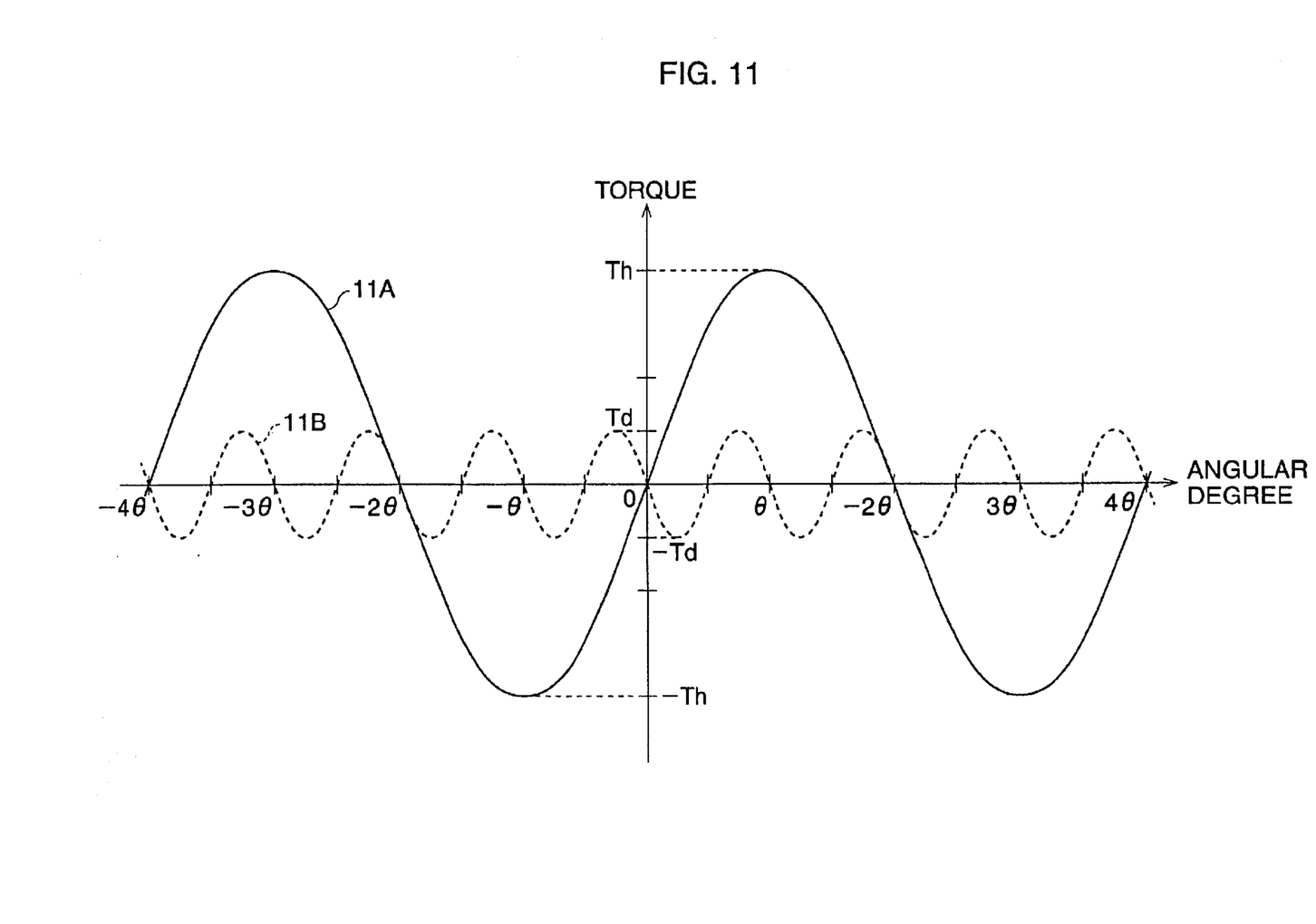
FIG. 11 is a graph indicating a torque curve of a rotor of a stepping motor.

With reference to FIG. 11, maintaining the position of the motors 331, 341 in a state when the stepping motors 331, 341 are electrically de-energized will be explained. FIG. 11 is a graph indicating torque generated when the rotor of the stepping motors 331, 341 is rotated by externally applied forces. In FIG. 11, the ordinate represents torque, and the abscissa represents a rotational angular degree of the rotor. A curve 11A is a torque curve indicating torque generated when the electric current flows through the coil in order to keep the rotor at a predetermined position (an angle of 0 degrees). A curve 11B is a torque curve indicating torque generated when the coil becomes electrically de-energized in a state when the rotor is placed at the angle of 0 degrees by supplying the electric current to the coil.

As the curve 11A shows, if an external torque, which is applies to the rotor, exceeds a holding torque Th in a state when the coil is electrically energized and the rotor is stopped at the angle of 0 degrees, the rotor rotates. In other words, when the external torque is smaller than the holding torque Th, the rotor has an ability of maintaining a position within ±θ degrees of a present position.

On the other hand, if the external torque exceeds a detent torque Td, which is less than the holding torque Th, in a state when the coil is electrically de-energized, the rotor rotates. If the external torque is less than the detent torque Td, the rotor has an ability of maintaining a position within ±θ/4 degrees of the present position. Namely, while the coil is electrically de-energized, the rotor can be rotated with a small externally applied force. Note that the detent torque means a maximum torque able to be generated by the rotor, in order to maintain a position and to resist an external torque to rotate the rotor when the coil is not excited.

As described above, in this embodiment, the screw feeder mechanism is utilized to transmit the rotational movement of the stepping motors 331, 341 to the frames 301, 302 as a linear movement. If a force is externally applied to the binoculars 1 in a state when the coil is electrically de-energized, the externally applied force is usually transmitted in a thrust direction of the screw feeder mechanism, namely, in a direction in which the movable member of the screw feeder mechanism moves. However, due to the existence of the male and female threads the externally applied force is transmitted in the rotational direction of the rotor, therefore enabling a deceleration mechanism to be applied to the shaft of the screw feeder mechanism, which dissipates the force by a predetermined deceleration, so that torque which exceeds the detent torque Td is not generated.

Accordingly, when the remaining amount of electric power of a power battery is reduced and the electric power is not supplied to the stepping motors 331, 341, the rotors are maintained at positions at which the rotors are stopped when the electric power supplying is stopped. Also, the driving frames 301, 302 are maintained at positions at which the driving frames 301, 302 are stopped when the electric power supplying is stopped. Namely, if the electric power supplying to the lengthwise-direction and the lateral-direction actuators 330, 340 is stopped, the correction lenses 31, 32 are maintained at the positions of that time.

As shown in FIG. 2, a lateral-direction reset position detecting sensor 360 is fixed in close proximity to the second correction lens 32 at an upper portion of the lateral-direction driving frame 302. The sensor 360 is a transmission-type photo-interrupter. A lateral-direction reset position detecting plate 361 is fixed by the screw 321, in close proximity to the second correction lens 32 at an upper portion of the lengthwise-direction driving frame 301. The detecting plate 361 is a thin plate.

Further, as is apparent from FIG. 2, a moving range of the frame 301 is defined by the inner wall of the flange 1a, and a moving range of the frame 302 is defined by the opening portion of the frame 301. Namely, if the frame 301 is driven in a direction parting from the lengthwise-direction moving center position, the frame 301 is stopped at a stop position at which the corners of the frame 301 are in contact with the inner wall of the flange 1a. Also, if the frame 302 is driven in a direction parting from the lateral-direction moving center position, the frame 302 is stopped at a stop position at which one of the lengthwise-direction side surfaces of the frame 302 in contact with the inner wall of the opening of the frame 301. In this specification, when the frame 301 is at the above-mentioned stop position, or the frame 302 is at the above-mentioned stop position, the positions of the first and second correction lenses 31, 32 are respectively referred to as a "moving limit position". In other words, with respect to the lengthwise and lateral directions, the moving limit positions are furthest from the standard position.

Figure 5:
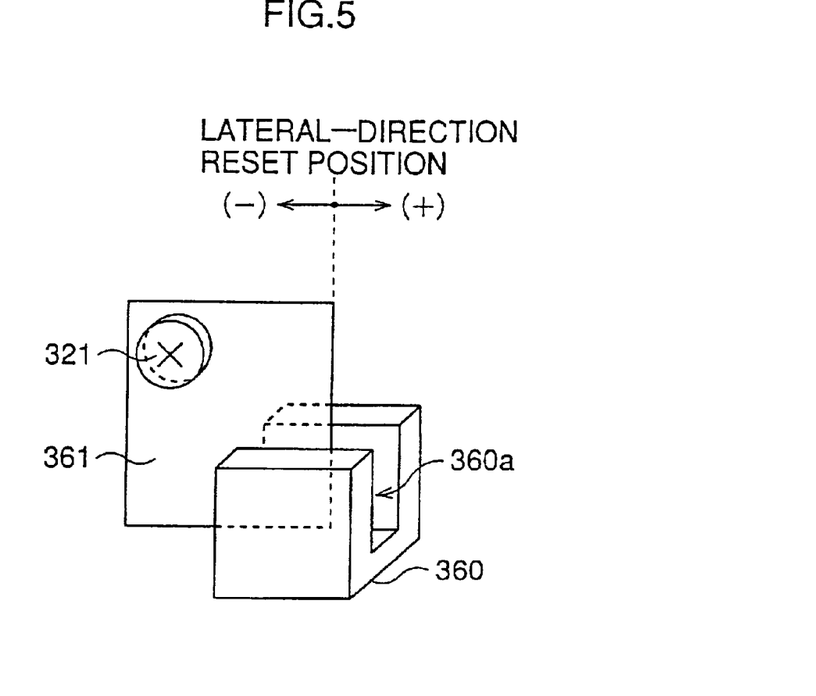
FIG. 5 is a conceptional view showing a positional relationship between a reset position detecting sensor and a reset position detecting plate.

FIG. 5 indicates a positional relationship between the lateral-direction reset position detecting sensor 360 and the lateral-direction reset position detecting plate 361. The sectional shape of the sensor 360 is a hollow-shaped. The sensor 360 includes a light-emitting element and a photo-receptor element (omitted in FIG. 5), facing each other with a space 360a therebetween. The detecting plate 361 is interposed in the space 360a. In accordance with the movement of the lateral-direction driving frame 302, the sensor 360, fixed on the frame 302, moves, so that the position of the detecting plate 361 in the space 360a changes, causing a change in voltage output from the sensor 360.

In this embodiment, the sensor 360 and the detecting plate 361 are mounted such that the voltage output from the sensor 360 changes when the driving frame 302 is positioned at the lateral-direction moving center position. Note that, the position of the driving frame 302, when the voltage output from the sensor 360 changes, is referred to as "the lateral-direction reset position". In other words, from the view point of design, when the driving frame 302 is positioned at the lateral-direction moving center position, the driving frame 302 is also positioned at the lateral-direction reset position.

Namely, the lateral-direction reset position coincides with the lateral-direction moving center position.

Figure 6:
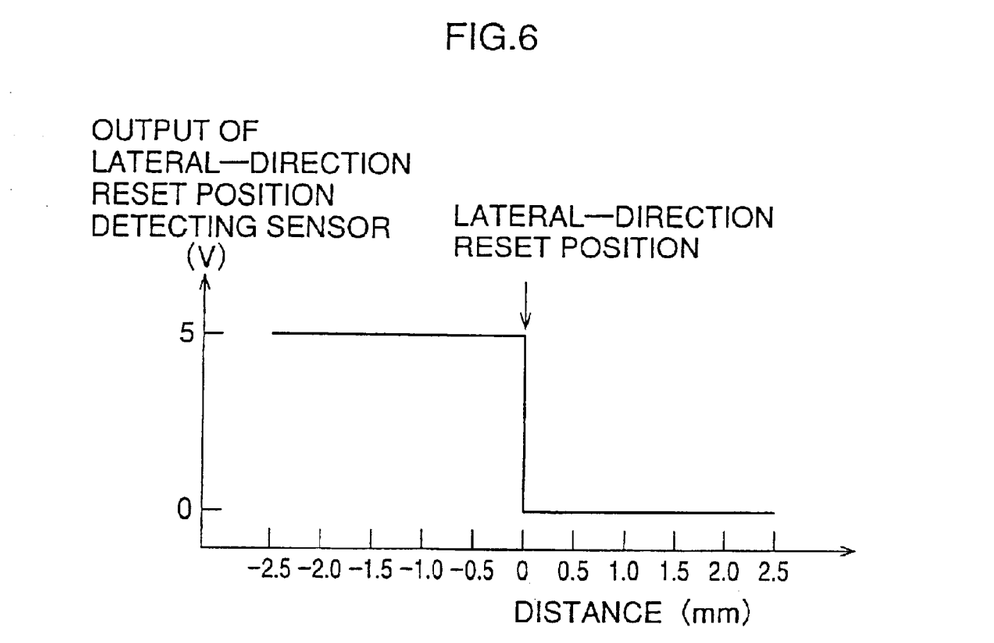
FIG. 6 is a graph indicating an output signal from the reset position detecting sensor.

FIG. 6 is a graph indicating an output signal from the lateral-direction reset position detecting sensor 360. When the driving frame 302 is shifted in the direction x2 (see FIG. 2) from the lateral-direction reset position, namely, when the detecting plate 361 is shifted to a+ (plus) side in FIG. 5, a luminance flux, emitted from the light-emitting element, is intercepted by the detecting plate 361, so that the luminance flux is blocked from the photoreceptor element. Accordingly, the voltage output from the sensor 360 is "0" volts. On the other hand, when the driving frame 302 is shifted in the direction x1 (see FIG. 2) from the lateral-direction reset position, namely, when the detecting plate 361 is shifted to a − (minus) side in FIG. 5, the luminance flux is not intercepted by the detecting plate 361, and the luminance flux is inputted to the photoreceptor element. Accordingly, the voltage output from the sensor 360 is "5" volts.

Therefore, it can be checked whether the driving frame 302 is positioned at the lateral-direction reset position, by detecting the change of voltage output from the sensor 360, being from 0 volts to 5 volts, or from 5 volts to 0 volts.

As shown in FIG. 2, a lengthwise-direction reset position detecting sensor 350 is fixed on an upper portion of a left end of the lengthwise-direction driving frame 301. Similarly to the sensor 360, the sensor 350 is a transmission-type photo-interrupter, including a light-emitting element and a photo-receptor element (not shown), facing each other with a predetermined space therebetween. A lengthwise-direction reset position detecting plate 351 is fixed on an upper portion of the left end of the flange 1a. Similarly to the detecting plate 361, the detecting plate 351 is a thin plate. The detecting plate 351 is interposed between the light-emitting element and the photo-receptor element of the sensor 350. In accordance with a change in the positional relationship between the sensor 350 and the detecting plate 351, caused by the movement of the frame 301, a voltage signal outputted from the sensor 350 changes.

In this embodiment, the sensor 350 and the detecting plate 351 are mounted such that the voltage output from the sensor 350 changes when the driving frame 301 is positioned at the lengthwise-direction moving center position. Note that, the position of the driving frame 301, when the voltage output from the sensor 350 changes, is referred to as "the lengthwise-direction reset position". Namely, the lengthwise-direction reset position coincides with the lengthwise-direction moving center position.

When the driving frame 301 is shifted in the direction y2 (see FIG. 2) from the lengthwise-direction reset position, a luminance flux, emitted from the light-emitting element of the sensor 350, is not intercepted by the detecting plate 351, so that the luminance flux is inputted to the photoreceptor element of the sensor 350. Accordingly, the voltage output from the sensor 350 is "5" volts. On the other hand, when the driving frame 301 is shifted in the direction y1 (see FIG. 2) from the lengthwise-direction reset position, the luminance flux is intercepted by the detecting plate 351 and not inputted to the photoreceptor element. Accordingly, the voltage output from the sensor 350 is "0" volts.

Namely, similarly to checking the lateral-direction reset position, it can be checked whether the driving frame 301 is positioned at the lengthwise-direction reset position, by detecting the change of voltage output from the sensor 350, being from 0 volts to 5 volts, or from 5 volts to 0 volts.

As described above, in this embodiment, the lengthwise-direction driving frame 301 and the lateral-direction driving frame 302 are united in the lens holding frame 30. Further, a driving mechanism of the correction lenses 31, 32, including the direct-drive mechanisms, the reset position detecting sensors 350, 360 and the reset position detecting plates 351, 361, is formed as one unit. Accordingly, the driving mechanism is easily mountable in the binoculars.

In the reset position detecting mechanisms (350, 351, 360, 361) of this embodiment: the reset position detecting plate 351 is fixed on the flange 1a which is unmovable in the lengthwise direction and the transmission-type photo-interrupter 350 is fixed on the driving frame 301, which is movable in the lengthwise direction; and the reset position detecting plate 361 is fixed on the driving frame 301, which is unmovable in the lateral direction and the transmission-type photo-interrupter 360 is fixed on the driving frame 302, which is movable in the lateral direction.

However, it is possible to reverse the positional relationships between the reset position detecting plates (351, 361) and the transmission-type photo-interrupters (350, 360). The transmission-type photo-interrupter 350 may be fixed on the flange 1a and the reset position detecting plate 351 may be fixed on the driving frame 301, such that the reset position detecting plate 351 moves with the driving frame 301. Also, the transmission-type photo-interrupter 360 may be fixed on the driving frame 301 and the reset position detecting plate 361 may be fixed on the driving frame 302, such that the reset position detecting plate 361 moves with the driving frame 302.

Namely, the reset position detecting mechanisms (350, 351, 360, 361) may have such a construction that the positional relationship between the reset position detecting plates (351, 361) and the transmission-type photo-interrupters (350, 360) are changed with respect to the driving frame utilized (301, 302), whereby the output signal of the transmission-type photo-interrupters (350, 360) change accordingly.

Further, in this embodiment, the transmission-type photo-interrupters (350, 360) are utilized as the reset position detecting sensors. However, reflection-type photo-interrupters (photo-reflectors), in which a photo-receptor element detects reflected light from an object, can be utilized. The photoreceptor elements and light-emitting elements are disposed such that a light emitting surface of the light-emitting elements and a light receiving surface of the photoreceptor elements face in a same direction, and reset position detecting plates are respectively placed, facing the light emitting surfaces and the light receiving surfaces. The positional relationship between the reflection-type photo-interrupters and the reset position detecting plates is confirmed based on whether light emitted from the light-emitting elements is incident on the photo-receptor elements. Accordingly, it is thus judged whether the driving frames (301, 302) are at the reset positions.

Furthermore, similar to the case in which the transmission-type photo-interrupters (350, 360) are utilized, the reflection-type photo-interrupters and the plates may be disposed such that the positional relationships between the reflection-type photo-interrupters and the plates change with respect to the driving frame utilized (301, 302).

Namely, with respect to the reset position detecting mechanism in the lengthwise direction, the plates may be fixed on the flange 1a and the reflection-type photo-interrupter may be fixed on the driving frame 301; or the plates may be fixed on the driving frame 301 and the reflection-type photo-interrupter may be fixed on the flange 1a. Also, with respect to the reset position detecting mechanism in the lateral direction, the plates may be fixed on the driving frame 301 and the reflection-type photo-interrupter may be fixed on the driving frames 302; or the plates may be fixed on the driving frame 302 and the reflection-type photo-interrupter may be fixed on the driving frame 301.

Figure 7:
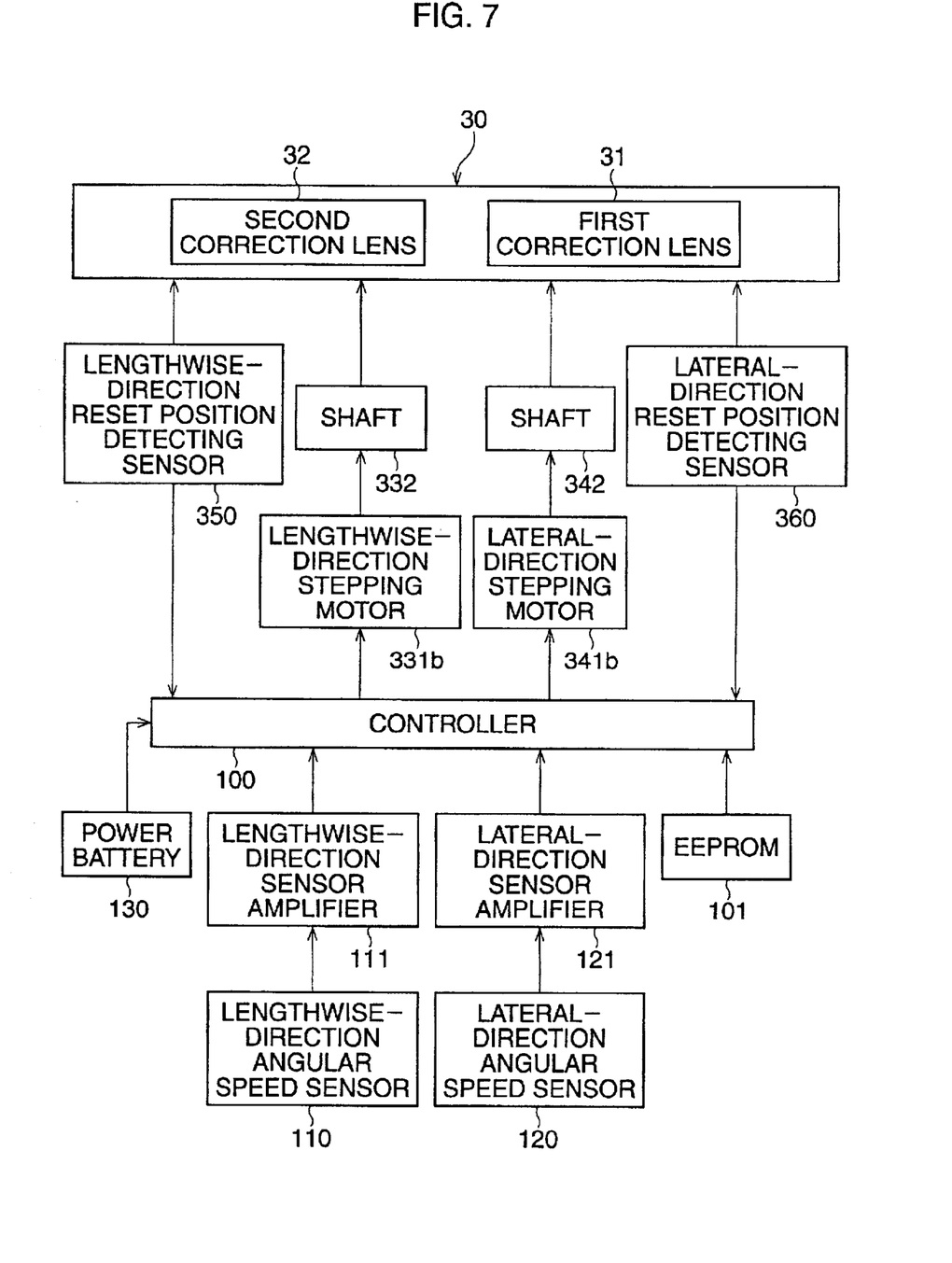
FIG. 7 is a block diagram of a tremble preventing apparatus of the embodiment.

FIG. 7 is a block diagram of the tremble preventing device of this embodiment.

A lengthwise-direction angular speed sensor 110 detects a vector and an angular speed of a trembling in the lengthwise direction, and a lateral-direction angular speed sensor 120 detects a vector and an angular speed of a trembling in the lateral direction, while the binoculars are being held by a user.

A lengthwise-direction sensor amplifier 111 is connected to the angular speed sensor 110, amplifying the lengthwise-direction angular speed outputted from the angular speed sensor 110. The amplified lengthwise-direction angular speed, outputted from the sensor amplifier 111, is inputted to a controller 100. The controller 100 is, for example, a micro computer. Similarly, a lateral-direction sensor amplifier 121 is connected to the angular speed sensor 120, amplifying the lateral-direction angular speed outputted from the angular speed sensor 120. The amplified lateral-direction angular speed outputted from the sensor amplifier 121 is inputted to the controller 100.

In the controller 100, the lengthwise-direction angular speed and the lateral-direction angular speed are respectively converted to digital values, based on a predetermined synchronous signal. Each digital value is subjected to integration, so that a lengthwise-direction angular displacement signal and a lateral-direction angular displacement signal, respectively corresponding to an amount of hand tremble in each of the directions, are calculated. Based on the lengthwise-direction angular displacement signal, a lengthwise-direction driving amount of the lens supporting frame 30 in a plane perpendicular to the optical axes OP1 and OP2, i.e. a driving step number of the motor 331b of the lengthwise-direction actuator 330 (pulse number inputted to the motor 331b), is calculated. Similarly, based on the lateral-direction angular displacement signal, a lateral-direction driving amount of the lens supporting frame 30 in a plane, i.e. a driving step number of the motor 341b of the lateral-direction actuator 340 (pulse number inputted to the motor 341b), is calculated.

The motor 331b of the lengthwise-direction actuator 330 is rotated based on the pulse number outputted from the controller 100. The rotational motion of the motor 331b is transmitted to the lens supporting frame 30 through the shaft 332, so that the lens supporting frame 30 is moved in the lengthwise-direction. Similarly, the motor 341b of the lateral-direction actuator 340 is rotated based on the pulse number outputted from the controller 100. The rotational motion of the motor 341b is transmitted to the lens supporting frame 30 through the shaft 342, so that the lens supporting frame 30 is moved in the lateral-direction.

The lengthwise-direction reset position detecting sensor 350 and the lateral-direction reset position detecting sensor 360 are connected to the controller 100. When the lens supporting frame 30 is placed at the lengthwise-direction reset position, the signal output from the reset position detecting sensor 350 changes. When the lens supporting frame 30 is placed at the lateral-direction reset position, the signal output from the reset position detecting sensor 360 changes. Both signals are inputted to the controller 100. The controller 100 judges whether the lens supporting frame 30 is placed at the lengthwise-direction and lateral-direction reset positions, by detecting the change of each signal.

Further, an EEPROM 101 is connected to the controller 100. The EEPROM 101 a nonvolatile memory which is erasable and programable. The differences between the reset position and the moving center position, with respect to the lengthwise direction and the lateral direction, are stored in the EEPROM 101. As described above, from the viewpoint of design, the lengthwise-direction reset position coincides with the lengthwise-direction moving center position, and the lateral-direction reset position coincides with the lateral-direction moving center position. However, the differences are generated due to, for example, a tolerance in processing. Therefore, after reading the differences stored in the EEPROM 101, the controller 100 outputs predetermined pulse numbers to the motors 331b and 341b based on the differences, such that the lens supporting frame 30 is moved from the reset position to the moving center position with respect to the lengthwise direction and the lateral direction.

A power battery 130 is a power which supplies electric power to the tremble preventing device of the present embodiment. When a power switch (not shown) of the binoculars is turned on, electric power is supplied from the power battery 130 to the controller 100, the EEPROM 101, the angular speed sensors 110 and 120, the sensor amplifiers 111 and 121, the stepping motor 331b and 341b, and the reset position detecting sensors 350 and 360. Further, the power battery 130 is connected to the controller 100 by a power line (not shown) and a signal line. The controller 100 monitors change of the output voltage level of the power battery 130 at a predetermined period, using the signal line.

A threshold VH is stored in the EEPROM 101. The threshold VH is used for judging if the output voltage level of the power battery 130 falls to be near the dead level. The value of the threshold VH is set such that the remaining electric power of the power battery 130 is enough that the motor 331b of the actuator 330 can drive the frame 301 from the moving limit position to the lengthwise-direction reset position, further to the lengthwise-direction moving center position, and the motor 341b of the actuator 340 can drive the frame 302 from the moving limit position to the lateral-direction reset position, further to the lateral-direction moving center position. In other words, the value of the threshold VH is set such that the remaining electric power is enough for the motors 331b and 341b to drive the lens supporting frame 30 from the moving limit position to the standard position.

Note that, the value of the threshold VH is decided by an experiment under a manufacturing process of the binoculars, before being stored in the EEPROM 101. Accordingly, the value of the threshold VH is appropriately set in accordance with the individual difference of products of the binoculars and the tremble preventing device.

The controller 100 compares the output voltage level of the power battery 130 with the threshold VH stored in the EEPROM 101. If it is detected that the output voltage level is below the threshold VH and reaches the dead level, the controller 100 drives the motors 331b, 341b based on the output of the lengthwise-direction and lateral-direction reset position detecting sensors so that the frames 301, 302 are respectively driven to the moving center position.

A process of the tremble preventing operation of this embodiment will now be explained, with reference to FIGS. 8 through 10.

Figure 8:
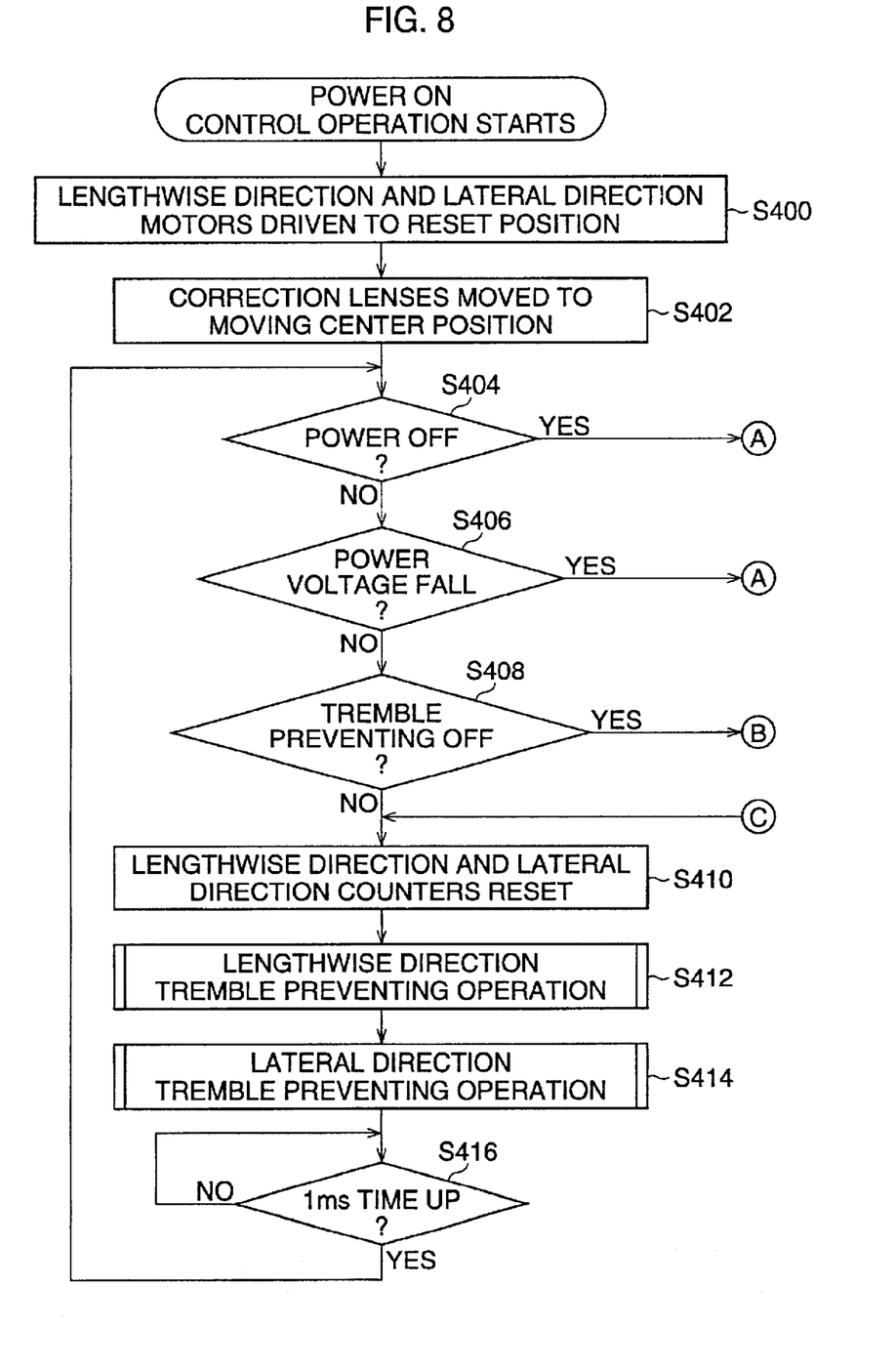
FIG. 8 is a flowchart indicating processes of a main routine of a tremble preventing operation.

FIG. 8 is a flowchart indicating processes of a main routine of the tremble preventing operation of this embodiment; FIG. 9 is a flowchart indicating processes when the power switch of the binoculars is turned off; and FIG. 10 is a flowchart indicating processes when the tremble preventing switch is turned off.

In FIG. 8, when the power switch of the binoculars is pressed and power is supplied to the controller 100, the main routine is started. In step S400, the motor 331b of the lengthwise-direction actuator 330 and the motor 341b of the lateral-direction actuator 340 are driven such that the lengthwise-direction driving frame 301 and the lateral-direction driving frame 302 are respectively disposed at the reset positions. Then, in step S402, the differences between the reset positions and the moving center positions are read out from the EEPROM 101, and the motors 331b and 341b are driven based on the differences, so that the driving frame 301 is moved to be disposed at the lengthwise-direction moving center position and the driving frame 302 is moved to be disposed at the lateral-direction moving center position.

Then, in step S404, the state of the power switch is detected. If the power switch is OFF, the process goes to the procedure (S500) of FIG. 9.

Figure 9:
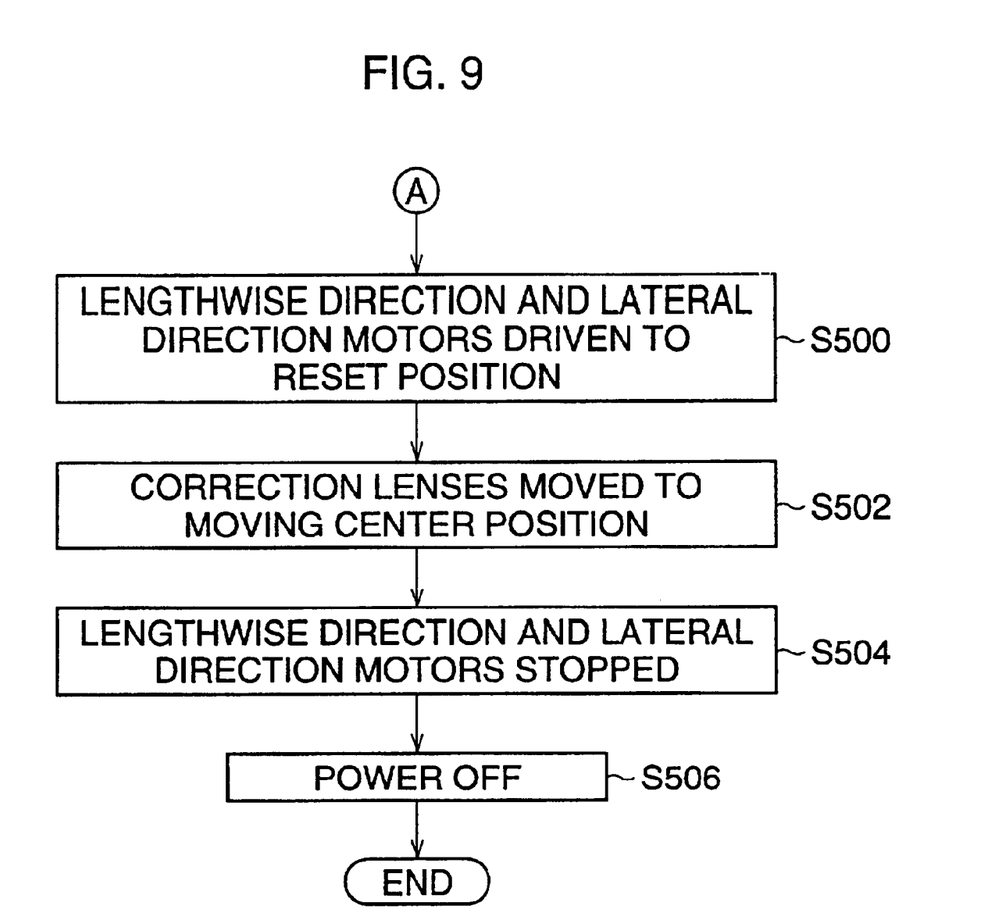
FIG. 9 is a flowchart indicating processes of power off of the binoculars.

In FIG. 9, in step S500, the motors 331b and 341b are respectively driven such that the lengthwise-direction driving frame 301 and the lateral-direction driving frame 302 are respectively disposed at the reset positions.

In step S502, the motors 331b and 341b are respectively driven based on the differences between the reset positions and the moving center positions read out from the EEPROM 101, so that the driving frame 301 is driven to the lengthwise-direction moving center position and the driving frame 302 is driven to the lateral-direction moving center position. Then, in step S504, the motors 331b and 341b are stopped. In step S506, the supply of the power is stopped and the process ends.

On the other hand, if it is confirmed in step S404 of FIG. 8 that the power switch is ON, the process goes to step S406. In step S406, the output voltage level of the power battery 130 is compared with the threshold VH stored in the EEPROM 101. If it is confirmed that the output voltage level of the power battery 130 is below the threshold VH, the process goes to step S500 of FIG. 9, and the before-mentioned ending procedure is carried out. If it is confirmed that the output voltage level of the power battery 130 is not below the threshold VH, the process goes to step S408.

In step S408, the state of the tremble preventing switch is detected. If the tremble preventing switch is OFF, the process goes to step S600 of the flowchart of FIG. 10. If the tremble preventing switch is ON, the process goes to step S410.

Figure 10:
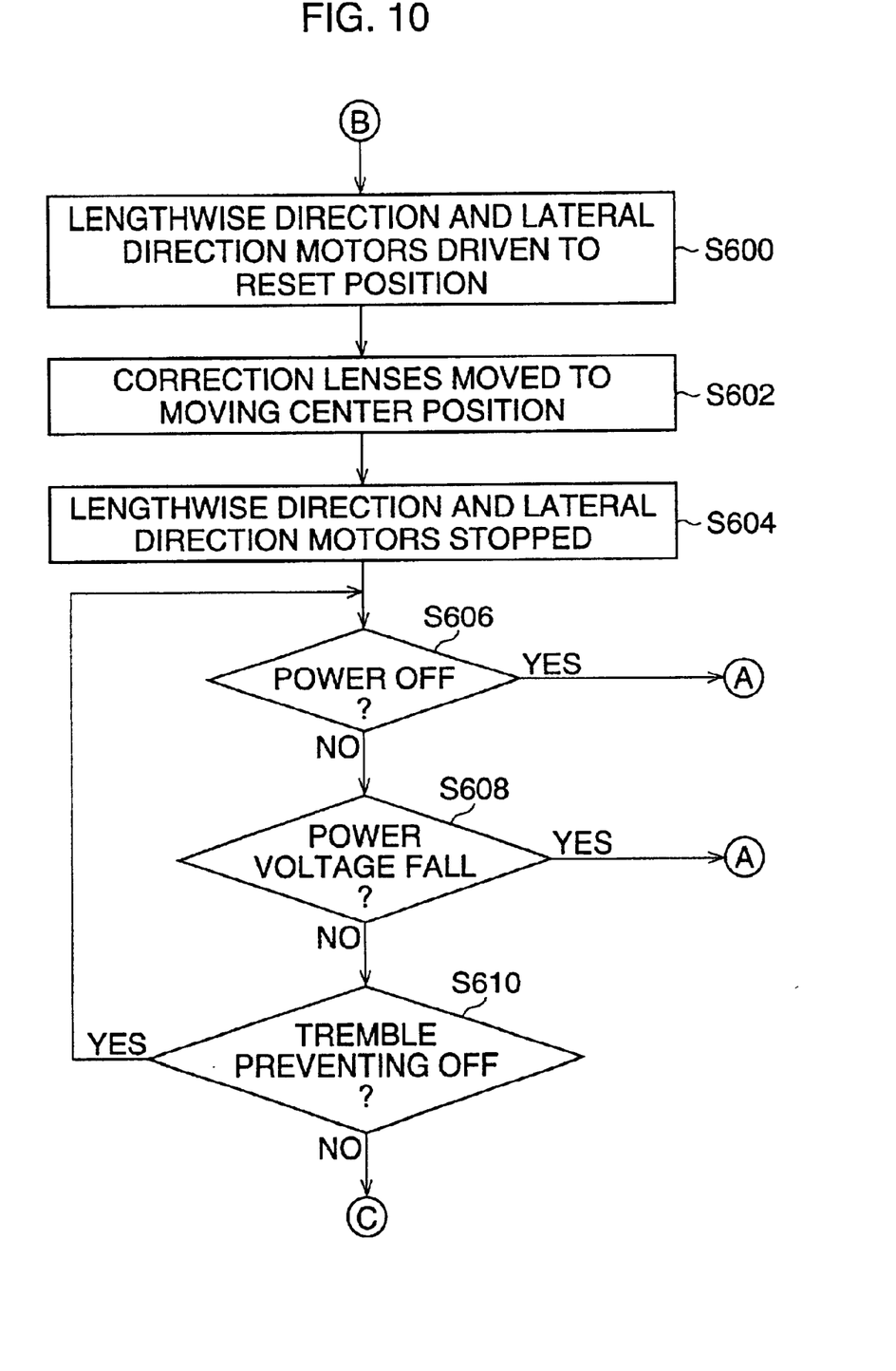
FIG. 10 is a flowchart indicating processes of turning off of a tremble preventing switch.

In FIG. 10, in step S600, the motor 331b of the lengthwise-direction actuator 330 and the motor 341b of the lateral-direction actuator 340 are respectively driven such that the lengthwise-direction driving frame 301 and the lateral-direction driving frame 302 are respectively disposed at the reset positions. In step S602, similarly to the operation in step S502, the motors 331b and 341b are respectively driven, so that the driving frame 301 is driven to the lengthwise-direction moving center position and the driving frame 302 is driven to the lateral-direction moving center position.

In step S604, the motors 331b and 341b are stopped, then the process goes to step S606. In step S606, the state of the power switch is detected. If the power switch is OFF, the process jumps to step S500 of FIG. 9 and the before-mentioned ending operation is carried out. If the power switch is ON, the process goes to step S608. In step S608, the output voltage level of the power battery 130 is compared with the threshold VH stored in the EEPROM 101, similarly to step S406 of FIG. 8. If it is confirmed that the output voltage level of the power battery 130 is below the threshold VH, the process goes to step S500 of FIG. 9, and the before-mentioned ending operation is carried out. On the other hand, if it is confirmed that the output voltage level of the power battery 130 is not below the threshold VH, the process goes to step S610.

In step S610, the state of the tremble preventing switch is detected. If the tremble preventing switch is OFF, the process returns to step S606, and if the tremble preventing switch is ON, the process goes to step S410 of FIG. 8. Namely, the operations from step S606 through step S610 are repeatedly performed, until the power switch is turned OFF or the tremble preventing switch is turned ON.

As described above, when it is judged that the tremble preventing switch is ON in step S408 of FIG. 8 or in step S610 of FIG. 10, the process goes to step S410 of FIG. 8. In step S410, a lengthwise-direction counter and a lateral-direction counter are set to "0".

When the motor 331b rotates in the forward direction, the step amount of the motor 331b is added to the value of the lengthwise-direction counter, and when the motor 331b rotates in the reverse direction, the step amount of the motor 331b is subtracted from the value of the lengthwise-direction counter.

When the motor 341b rotates in the forward direction, the step amount of the motor 341b is added to the value of the lateral-direction counter, and when the motor 341b rotates in the reverse direction, the step amount of the motor 341b is subtracted from the value of the lateral-direction counter.

Then, in step S412, a tremble preventing operation in the lengthwise direction is performed. The lengthwise-direction angular speed, outputted from the lengthwise-direction angular speed sensor 110, is converted to a digital data in the controller 100. The lengthwise-direction angular displacement is calculated by integrating the digital data. A driving pulse amount of the motor 331b of the lengthwise-direction actuator 330 is calculated based on the angular displacement. When the motor 331b is rotated in the forward direction, the driving pulse amount is attached with a plus sign (+). When the motor 331b is rotated in the reverse direction, the driving pulse amount is attached with a minus sign (−).

Rotational movement of the motor 331b in the forward and reverse directions are repeatedly performed, until the driving pulse amount coincides with the lengthwise-direction counter. In accordance with the rotation of the motor 331b, the driving frame 301 is driven such that the tremble in the lengthwise direction of the binoculars 1 is canceled, so that the tremble of the focused image is corrected in the lengthwise direction.

Then, in step S414, a tremble preventing operation in the lateral direction is performed. The operation in the lateral direction is performed similarly to the operation in the lengthwise direction. The lateral-direction angular speed, outputted from the lateral-direction angular speed sensor 120, is converted to a digital data in the controller 100. The lateral-direction angular displacement is calculated by integrating the digital data. A driving pulse amount of the motor 341b of the lateral-direction actuator 340 is calculated based on the angular displacement. When the motor 341b is rotated in the forward direction, the driving pulse amount is attached with a plus sign (+). When the motor 341b is rotated in the reverse direction, the driving pulse amount is attached with a minus sign (−).

Rotational movement of the motor 341b in the forward and reverse directions are repeatedly performed, until the driving pulse amount coincides with the lateral-direction counter. In accordance with the rotation of the motor 341b, the driving frame 302 is driven such that the tremble in the lateral direction of the binoculars 1 is canceled, so that the tremble of the focused image is corrected in the lateral direction.

After the tremble preventing operations in the lengthwise and lateral directions of steps S412 and S414 end, in step S416, it is judged whether a predetermined time has passed. The operation of step S416 is repeatedly performed until the predetermined time passes. After the predetermined time passes, the operations from step S404 are performed. Accordingly, the check (step S410) of the output voltage level of the power battery 130 and the tremble preventing operations (steps S412 and S414) are preformed once during the predetermined time. In this embodiment, the predetermined time is pre-set to 1 millisecond.

As described above, in this embodiment, the driving frames 301 and 302 are respectively driven to the moving center positions,: just after the power switch is turned ON; when the power switch is turned OFF; when the output voltage level of the power battery 130 falls to the level below the threshold VH; and when the tremble preventing button is released. Accordingly, while the tremble preventing operation is not being performed, the object image viewed through the first and second eyepieces 51 and 52 does not deviate from the optical axes of the lens barrels.

Note that, in the above explanation of the embodiment, the binoculars is used as an example, however the embodiment can be applied to other optical devices which are provided with the tremble preventing function.

According to the present invention, in an optical device provided with a tremble preventing function, an actual image can be always coincided with a theoretical object image that lies on the optical axes of the lens barrels, in a state where the tremble preventing function is not being carried out.

The present disclosure relates to subject matter contained in Japanese Patent Application No. 2001-054546 (filed on Feb. 28, 2001) which is expressly incorporated herein, by reference, in its entirety.

What is claimed is:

1. An optical device, provided with a tremble preventing function, comprises:

a tremble detector that detects an amount of an optical device tremble;

a correcting optical system, included in an imaging optical system of said optical device, that corrects a tremble of a focused image due to said optical device tremble;

a driving system that drives said correcting optical system in two directions on a plane perpendicular to an optical axis of said correcting optical system, and continues to maintain a position of said correcting optical system when a power supply to said optical device is stopped;

a controller that controls said driving system such that said optical device tremble amount is canceled;

a power battery that supplies electric power to said driving system; and a voltage level detector that detects an output voltage level of said power battery;

wherein when the output voltage level detected by said voltage level detector is below a predetermined threshold, said correcting optical system is driven to a standard position such that said optical axis of said correcting optical system coincides with an optical axis of other optical systems included in said imaging optical system.

2. An optical device according to claim 1, wherein the value of said threshold is set such that the remaining amount of electric power in said power battery is enough for said driving system to drive said correcting optical system from a moving limit position to said standard position, said moving limit position being defined by a holding member of said correcting optical system and being the furthest position from said standard position.

3. An optical device according to claim 1, further comprising a memory in which said predetermined threshold is stored.

4. An optical device according to claim 3, wherein said memory is an EEPROM.

5. An optical device, provided with a tremble preventing function, comprises:

means for detecting an amount of an optical device tremble;

a correcting optical system, included in an imaging optical system of said optical device, that corrects a tremble of a focused image due to said optical device tremble;

means for driving said correcting optical system in two directions on a plane perpendicular to an optical axis of said correcting optical system, and continuing to maintain a position of said correcting optical system when a power supply to said optical device is stopped;

means for controlling said driving means such that said optical device tremble amount is canceled;

a power battery that supplies electric power to said driving means; and means for detecting an output voltage level of said power battery;

means for controlling said driving means such that said correcting optical system is driven to a standard position such that said optical axis of said correcting optical system coincides with an optical axis of other optical systems included in said imaging optical system when an output voltage level detected by said output voltage level detecting means is below a predetermined threshold.

* * * * *